P. HINKLE.

Hatch for Street-Elevators.

No. 8,664. Reissued April 8, 1879.

Witnesses
W. Floyd Duckett
U. F. Clark.

Inventor
Philip Hinkle
per J. L. Borne
Attorney

P. HINKLE.

Hatch for Street-Elevators.

No. 8,664. Reissued April 8, 1879.

Witnesses
W. Floyd Duckett
U. T. Clark.

Inventor
Philip Hinkle
per J. L. Boone
Attorney

3 Sheets—Sheet 3.

P. HINKLE.

Hatch for Street-Elevators.

No. 8,664. Reissued April 8, 1879.

Witnesses:

W. Floyd Duckett

W. F. Clark

Inventor

Philip Hinkle per J. L. Boone

Attorney.

UNITED STATES PATENT OFFICE.

PHILIP HINKLE, OF SAN FRANCISCO, CALIFORNIA.

IMPROVEMENT IN HATCHES FOR STREET-ELEVATORS.

Specification forming part of Letters Patent No. 204,821, dated June 11, 1878; Reissue No. 8,661, dated April 8, 1879; application filed March 5, 1879.

*To all whom it may concern:*

Be it known that I, PHILIP HINKLE, of San Francisco, California, have invented certain Improvements in Hatches for Street-Elevators; and I hereby declare the following to be a full, clear, and exact description thereof, reference being had to the accompanying drawings, making part of this specification, in which—

Figure 1:
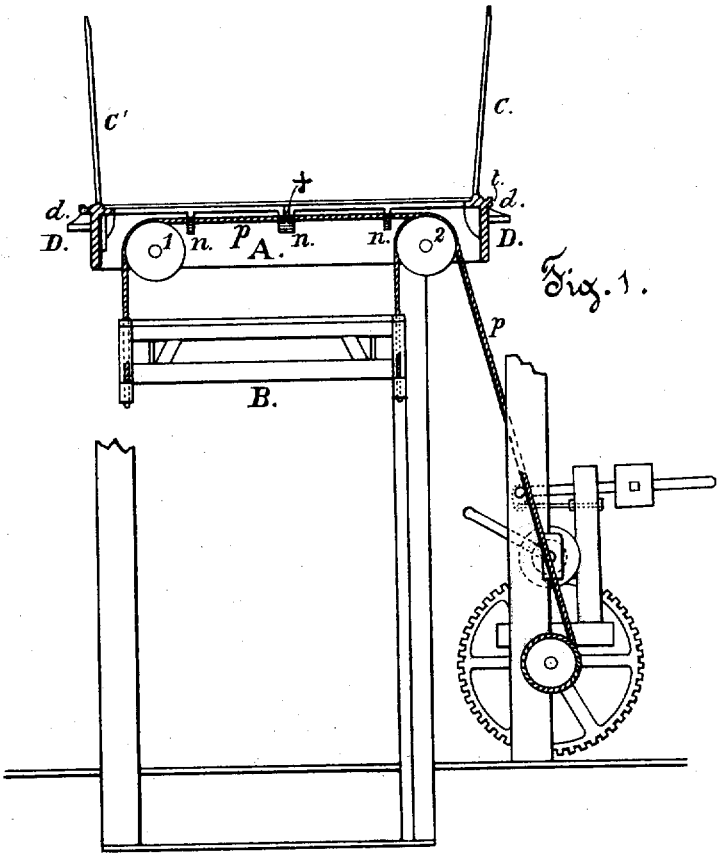
Figure 2:
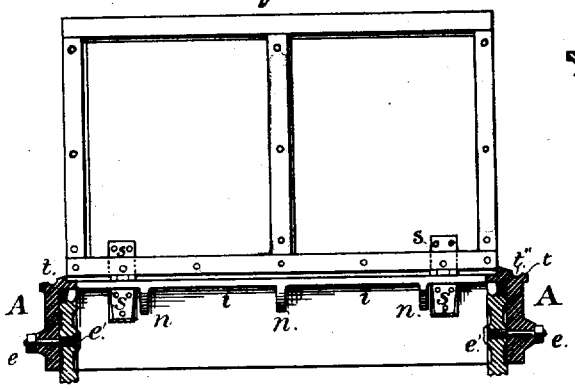
Figure 3:
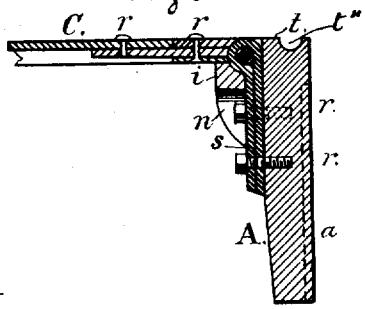
Figure 4:
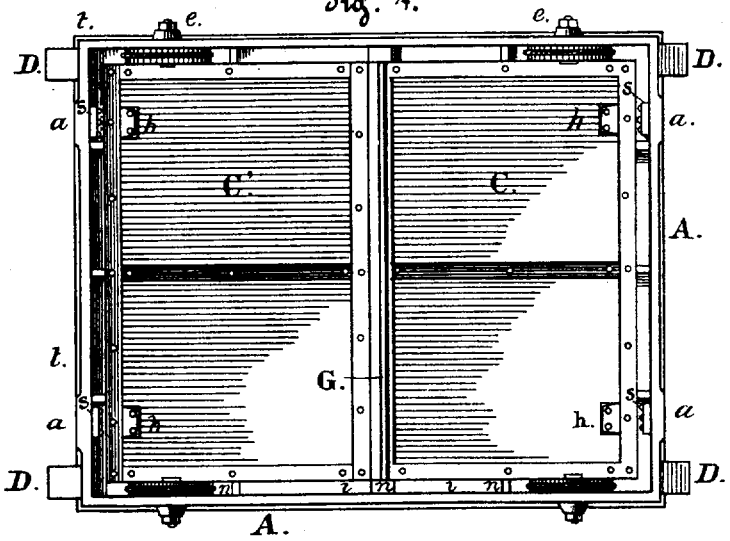
Figure 5:
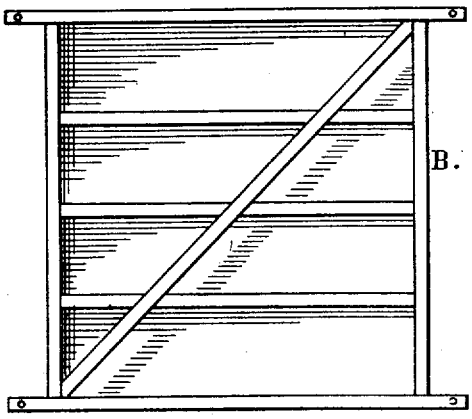
Figure 6:
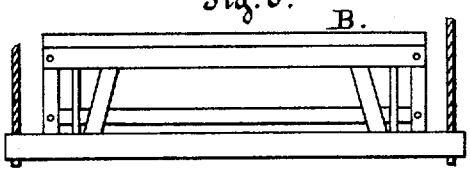
Figure 7:
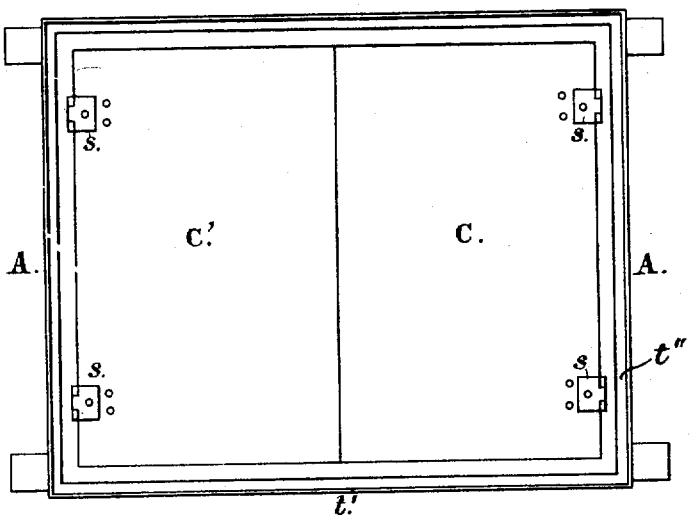

Figure 1 is a side elevation of the elevator applied and hatchway in section. Fig. 2 is an enlarged section of hatchway, showing one door open. Fig. 3 is a cross-section through side of frame and hinge. Fig. 4 is a bottom view of hatchway. Figs. 5 and 6 are details. Fig. 7 is a top view of hatch with doors closed.

My invention relates to the frame which is built into sidewalks around hatchway-openings for street-elevators; and it consists of certain improvements in the manner of making and constructing such frames, so as to secure the greatest amount of strength and solidity, and at the same time cheapen their cost of construction.

My invention consists in casting the hatchway-frame as an entirety, with lugs to hold it in the masonry, and an arrangement of ribs and brackets to sustain the doors, and also with bosses or projections to sustain the pins on which the hoisting-pulleys are journaled.

In order that those skilled in the art may make and use my invention, I will proceed to describe the manner in which I have carried it out.

In the said drawings, A is a rectangular iron hatchway-frame, cast in one piece integral with the frame. On its outside is cast a projecting rib, *t*, entirely around its upper edge. On the outside are also four projecting lugs, D D D D, braced by ribs *d d*, and four vertical strengthening ribs or projections, *a a*. On the inside of the frame, and cast integral with it, is a rib, *i*, slightly below the upper edge, and extending entirely around it.

The rib *i* is braced by a series of brackets, *n n*, cast on the frame, and those on two sides of the frame are supplied with holes *h*, to allow the hoisting-cords *p p* to pass through them in traveling from pulley 1 to pulley 2.

By leaving holes in the brackets and passing the hoisting-ropes through them, the ropes are protected from injury and are kept out of the way. This I consider a very important part of my invention.

The doors C C′ are hinged to the frame by means of hinges *s s*, so constructed and applied to the frame and the door that when the doors are closed down on rib *i* the hinges lie flush with the upper surface of the doors when the doors are closed, and form no impediment to walking over the hatchway. One leaf of each hinge is riveted to the door, and the other leaf is secured to the frame by bolts *r r*, so that by removing the bolts the doors can be readily taken off.

Integral with frame A, I also cast hollow bosses or studs, projecting outward, as seen at *e*, and projecting inward slightly, as seen at *e′*, to serve as journals for the spindles of the hoisting-pulleys 1 and 2.

Around the outside edges of the doors, and in the top of the frame A, I shall in some cases cast a depression or gutter, *t″*, and provide it with a spout, *t′*, leading to the street curb or gutter. This gutter and spout *t″ t′* will effectually prevent any water from running from the pavement across the hatch-doors and leaking through the joints.

Experience has shown me that little or no leakage takes place in this class of devices from the water falling directly on the doors; but the water draining from the pavement in flowing across the doors does the mischief, and by preventing this cross-flow I reduce the leakage to the minimum.

In the center brackets, *n n*, on each side of the frame, is a socket, *x*, to sustain a bar, G, which supports the doors at the center.

Having thus described my invention, what I claim, and desire to secure by Letters Patent, is—

1. The cast hatchway-frame A, provided with lugs D, braces *a*, rib *i*, brackets *n n*, bosses *e e′*, and gutter *t″*, with its spout *t′*, the whole cast integral, as set forth.

2. A hatchway-frame for sidewalks, composed of a single casting, and having the lugs D, brackets *n n*, and bosses *e e* cast as a part thereof, substantially as and for the purpose above described.

3. In a hatchway-frame for sidewalk-elevators, the brackets *n n*, cast in one piece with the frame, and provided with a hole or opening for the hoisting-ropes to pass through, substantially as and for the purpose described.

In witness whereof I have hereunto set my hand and seal.

PHILIP HINKLE. [L. S.]

Witnesses:
W. FLOYD DUCKETT,
W. F. CLARK.